(12) United States Patent
Gross

(10) Patent No.: US 12,502,842 B2
(45) Date of Patent: Dec. 23, 2025

(54) METHOD OF PERMANENTLY JOINING COMPOSITE PARTS MADE FROM THERMOPLASTIC MATERIAL, ARRANGEMENT OF COMPOSITE PARTS, AND AIRCRAFT

(71) Applicant: Airbus Operations GmbH, Hamburg (DE)

(72) Inventor: Claus-Peter Gross, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 453 days.

(21) Appl. No.: 17/866,040

(22) Filed: Jul. 15, 2022

(65) Prior Publication Data

US 2023/0016471 A1 Jan. 19, 2023

(30) Foreign Application Priority Data

Jul. 19, 2021 (EP) .................................... 21186412

(51) Int. Cl.
*B29C 65/60* (2006.01)
*B29C 65/42* (2006.01)
(Continued)

(52) U.S. Cl.
CPC ............ *B29C 65/605* (2013.01); *B29C 65/42* (2013.01); *B64C 1/12* (2013.01); *B29K 2101/12* (2013.01); *B29L 2031/3082* (2013.01)

(58) Field of Classification Search
CPC ....... B29C 65/605; B29C 65/42; B29C 70/84; B29C 45/14; B29C 66/12822; B64C 1/12;
(Continued)

(56) References Cited

U.S. PATENT DOCUMENTS

2016/0138637 A1* 5/2016 Kurokawa ............ F16B 19/086
411/82.1
2019/0293104 A1* 9/2019 Porter ....................... F16B 5/04
(Continued)

FOREIGN PATENT DOCUMENTS

DE 4419159 A1 * 12/1995 ............ B29C 65/483
DE 10101772 A1 * 7/2002 ................ B32B 3/10
(Continued)

OTHER PUBLICATIONS

European Search Report for Application No. 21186412 dated Dec. 9, 2021.

*Primary Examiner* — Benjamin P Lee
(74) *Attorney, Agent, or Firm* — KDW Firm PLLC

(57) ABSTRACT

A method of permanently joining composite parts made from thermoplastic material includes providing a first composite part and a second composite part, both made from thermoplastic material, wherein an orifice is provided in at least one of the composite parts, positioning both composite parts such that a portion of the composite part which includes the orifice is adjacent to a portion of the other composite part, injecting melted thermoplastic material through the orifice to contact the first and the second composite part in a contact area, whereby surfaces of the first and the second composite part in that contact area melt together; and solidifying the thermoplastic material in the orifice and in the contact area to permanently join the first composite part to the second composite part.

7 Claims, 5 Drawing Sheets

(51) Int. Cl.
*B64C 1/12* (2006.01)
*B29K 101/12* (2006.01)
*B29L 31/30* (2006.01)

(58) Field of Classification Search
CPC . B29K 2101/12; B29L 2031/3082; F16B 5/04
See application file for complete search history.

(56) References Cited

U.S. PATENT DOCUMENTS

2020/0353656 A1 * 11/2020 Okonski ........... B29C 45/14508
2024/0316873 A1 * 9/2024 Haruna ............. B29C 66/73921

FOREIGN PATENT DOCUMENTS

DE       10341134 B4 *   2/2006   ........... B29C 65/601
DE       10341134 A1 *   4/2025   ........... B29C 65/601
EP       1 335 137 A2    8/2003

* cited by examiner

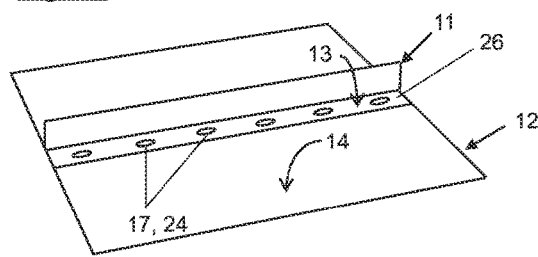
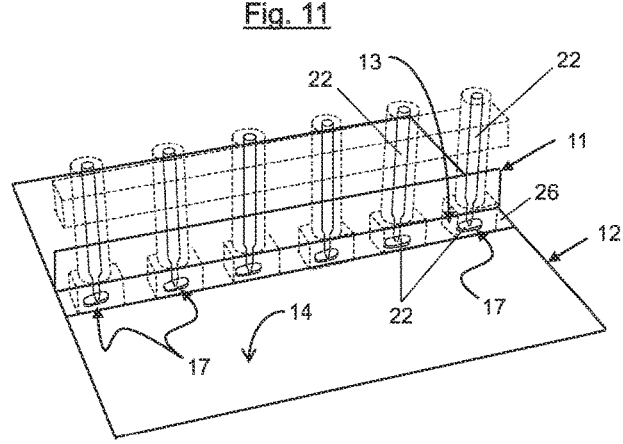
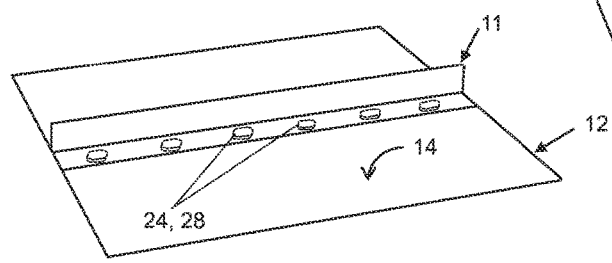

METHOD OF PERMANENTLY JOINING COMPOSITE PARTS MADE FROM THERMOPLASTIC MATERIAL, ARRANGEMENT OF COMPOSITE PARTS, AND AIRCRAFT

CROSS-REFERENCE TO RELATED APPLICATION

This application claims priority to EP Patent Application No. 21186412.9 filed Jul. 19, 2021, the entire disclosure of which is incorporated by reference herein.

TECHNICAL FIELD

The disclosure herein relates to a method of permanently joining composite parts made from thermoplastic material, an arrangement of composite parts made from thermoplastic material and an aircraft comprising an arrangement of composite parts made from thermoplastic material.

BACKGROUND

In modern aircrafts, the use of composite parts is important to decrease the weight of the aircraft and thus to reduce the energy consumption during flight. During production, composite parts need to be permanently joined together in order to create aircraft components of larger dimensions or to increase their strength.

Today's thermoplastic composite parts are usually permanent joined by mechanical fasteners like e.g. rivets. Alternative joining techniques are ultrasonic welding and resistance welding. However, these welding technologies are not mature to weld carbon fiber reinforced thermoplastics. Further, welding tests with ultrasonic and resistance welding do not achieve the expected quality.

SUMMARY

It is an object of the disclosure herein to permanently join parts made from thermoplastic composites by a fast process resulting in joined parts of high quality, and to improve the productivity.

The object is achieved by the subject matter herein. Advantageous embodiments are disclosed herein.

The disclosure herein provides a method of permanently joining composite parts made from thermoplastic material, comprising the steps:
- Providing a first composite part and a second composite part, both made from thermoplastic material, wherein an orifice is provided in at least one of the composite parts;
- Positioning both composite parts in a way that a portion of the composite part which comprises the orifice is adjacent to a portion of the other composite part;
- Injecting melted thermoplastic material through the orifice to contact the first and the second composite part in a contact area, whereby surfaces of the first and the second composite part in that contact area melt together; and
- Solidifying the thermoplastic material in the orifice and in the contact area to permanently join the first composite part to the second composite part.

Preferably, a portion of the contact area is formed at the inner wall of the orifice within the first composite part and at the bottom of the orifice formed by the surface of the second composite part in the area of the orifice.

Preferably, a portion of the contact area is formed to protrude over a portion of the first composite part on its side opposite the second composite part.

Preferably, the portion of the contact area protruding over the first composite part on each side of the orifice has at least half of the width of the contact area at the bottom of the orifice.

Preferably, the orifice is formed as an elongated hole.

Preferably, the first and the second composite part are clamped together after the step of positioning both parts.

Preferably, at least one of the composite parts is formed as a profile element.

Preferably, the heated and melted thermoplastic material is simultaneously injected in a plurality of orifices provided in at least one of the composite parts to permanently join the composite parts.

According to an aspect of the disclosure herein, an arrangement of composite parts made from thermoplastic material is provided, comprising a first composite part and a second composite part, both made from thermoplastic material and permanently joined together, wherein an orifice containing solidified thermoplastic material is provided in at least one of the composite parts and is contacting the first and the second composite part in a contact area thereof, whereby surfaces of the first and the second composite part in that contact area are melt together by the solidified thermoplastic material in the orifice and in the contact area.

Preferably, one of the composite parts is a skin element and the other composite part is a profile element.

Preferably, the profile element is a stringer.

Preferably, the arrangement is produced by the method according to the disclosure herein.

According to another aspect of the disclosure herein, an aircraft is provided which comprises an arrangement of composite parts according to the disclosure herein.

The disclosure herein achieves the advantages of a technology to join parts made from thermoplastic composites which can be carried out in a fast and relatively simple manner. Thermoplastic melted material is injected or applied locally onto parts to be joined. The technology to get thermoplastic into melt condition is available, e.g. heat guns can be used. Further, a fast process is achieved, since the parts are joined after a few seconds when the thermoplastic material temperature is below the melting temperature. Welding of long parts as e.g. stringers is possible, in particular by use of multiple injection spots, to improve productivity.

The disclosure herein provides a new welding concept applicable for thermoplastic composites. The disclosure herein uses the idea that melted thermoplastic material is injected locally through the orifice of one part. The second part has for example no orifice. By injecting the melted thermoplastic material at the parts to be joined, the surface of the parts that gets in contact with the melted material melts locally, since the local temperature at the parts surface in contact with the melted material gets also above the melting material temperature. This melted material will permanently join the parts when material temperature cools down below the melting temperature. The injected material joins both parts permanently. The inject material can be only thermoplastic or thermoplastic mixed with fibers like e.g. carbon short fibers, nanomaterials, etc. Thus, the injected material can e.g. be pure thermoplastic material, and it can e.g. also be a thermoplastic composite material.

BRIEF DESCRIPTION OF THE DRAWINGS

Embodiments of the disclosure herein are described in more detail with reference to the accompanying drawings.

FIGS. 10 through 12 depict different steps of the method according to a particularly preferred embodiment of the disclosure herein as a schematic view, wherein a profile element and a skin element are joined.

DETAILED DESCRIPTION

Reference is made to FIGS. 1 through 6 which show two parts 11, 12 made from thermoplastic composites during the process of being joined according to a preferred example.

Figure 1:
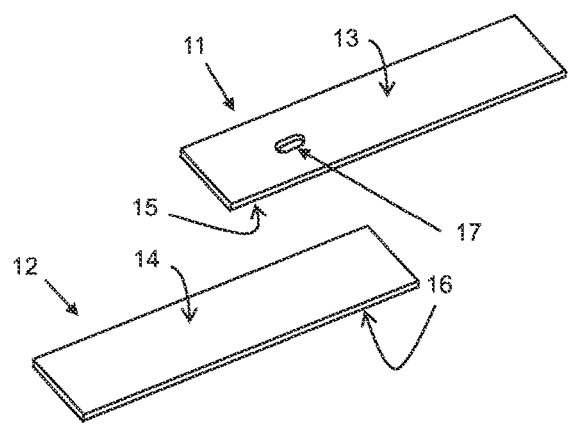
FIGS. 1 through 6 depict two parts during different steps of an injection welding process according to a preferred embodiment of the disclosure herein as a schematic view.

As shown in FIG. 1, both composite parts 11, 12, are formed as panels in this example, each having a top side 13, 14 and a bottom side 15, 16. In the first composite part 11 an orifice 17 is provided, which is formed as a through hole extending through the first composite part 11. In this example, the orifice 17 is formed as an elongated hole or oval opening. As a first step of the method, the two parts 11, 12 are provided.

Figure 2:
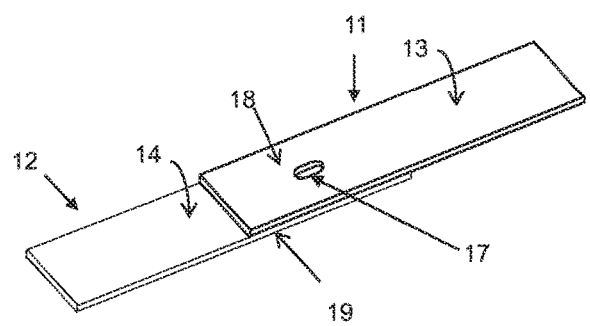

FIG. 2 shows the next step of the injection welding process. The first part 11 and the second part 12 are positioned in a way that a portion 18 of the first composite part surrounding the orifice 17 is adjacent to a portion 19 of the second composite part 12, both portions 18, 19 contacting each other at the underside 15 of the first composite part 11 and the upper side 14 of the second composite part 12. In this way, the orifice 17 forms an open container, which is closed at its bottom by the upper side 14 of the second composite part 12.

Figure 3:
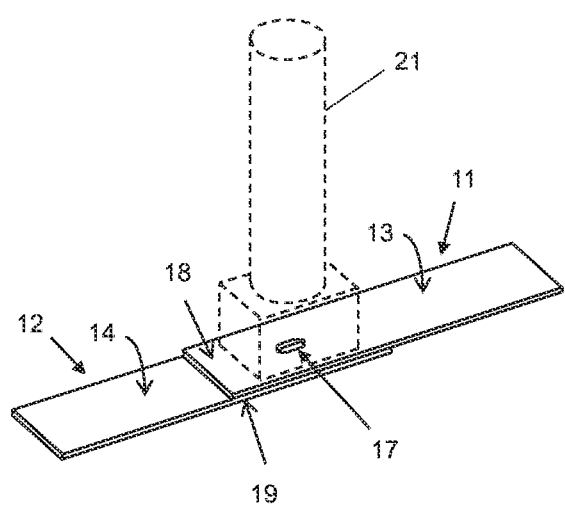

As shown in FIG. 3, both composite parts 11, 12 are clamped by a clamping tool 21 depicted in dotted lines, the clamping tool 21 being positioned on first composite part 11 directly in front of orifice 17.

Figure 4:
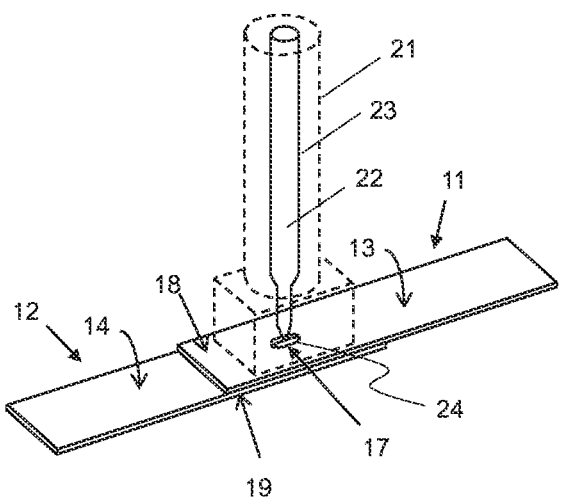

FIG. 4 shows a next step, in which melted material 22 provided by an injection device 23 is injected or filled into orifice 17, which forms an injection spot 24 and which is provided in the first composite part 11. Since orifice 17 is closed at its bottom by the upper side 14 of second composite part 12, the melted thermoplastic material fills the orifice 17. Injection device 23 is formed within clamping tool 21, thereby ensuring high quality of the welding point and a faster process.

The heated and melted thermoplastic material is injected locally through the orifice 17 of first part 11 to second part 12, which does not provide an orifice at this location. During injection the hot melted thermoplastic material 22 fills the orifice 17 and gets in contact with the first composite part 11 and with the second composite part 12. The melted thermoplastic material 22 contacts the upper side 14 of second part 12, which forms the bottom of the orifice 17, as well as the inner wall of the opening formed by orifice 17 within first part 11. The melted material also covers a part of the upper surface 13 of first part 11 and forms an overhang of thermoplastic material 22 around the edge of orifice 17.

In this way, surfaces of both parts 11, 12 which are made from thermoplastic material get in contact with the injected heated thermoplastic material 22 and melt together.

Figure 5:
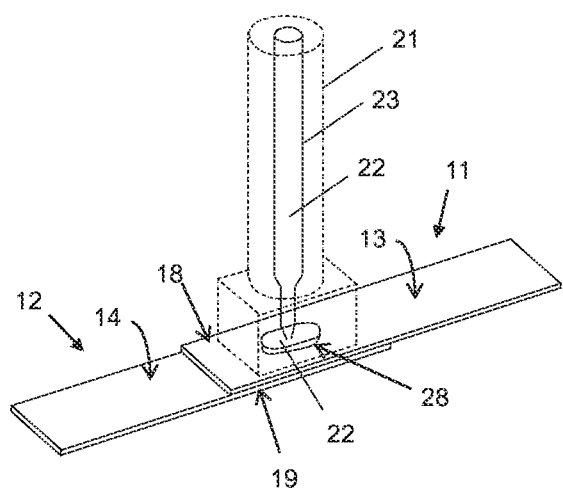

FIG. 5 shows the end of the injection step in which the injection of thermoplastic material 22 is completed. The thermoplastic material 22 completely fills orifice 17 and overlaps an edge portion surrounding orifice 17 at the upper side 13 of first part 12. Thus, a portion of the thermoplastic material 17 filled into orifice 17 also covers a portion of the upper side 17 of first part 11.

After the injection, the melted thermoplastic material 17 cools down below its melting temperature, whereby the thermoplastic material 22 solidifies, thereby forming a clasp or plug 28 similar to a rivet, which is welded into the thermoplastic materials of the parts 11, 12.

Figure 6:
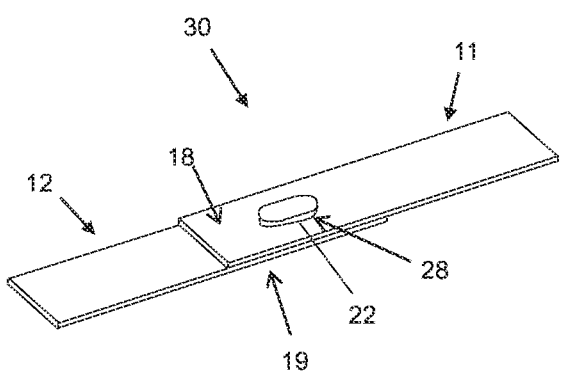

FIG. 6 shows a view of both parts 11, 12 after the welding process has been completed. The injected thermoplastic material 22, which has melted the thermoplastic material of both composite parts 11 and 12 in a contact area, has cooled down below the melting temperature. The injected and solidified thermoplastic material permanently joins both parts 11, 12 to form an arrangement 30 of two parts welded to each other Referring now to FIGS. 7 through 9, the dimensions of the contact area between the injected thermoplastic material 22 and both of the composite parts 11, 12 are shown in detail.

Figure 7:
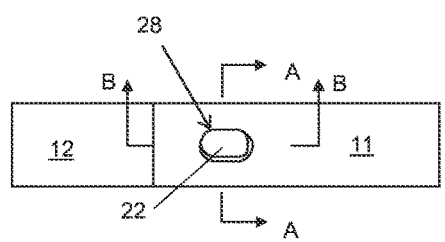
FIG. 7 depicts the joined parts shown in FIG. 6 as a schematic top view.

FIG. 7 depicts a top view of both parts 11, 12 joined to each other by thermoplastic welding as described above and shown in FIG. 6. The thermoplastic material 22 has been solidified to form plug 28. It fills and also covers orifice 17 which is not visible in this figure.

Figure 8:
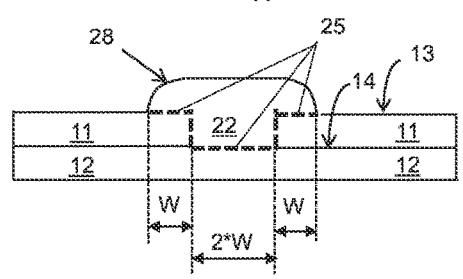
FIG. 8 depicts a schematic sectional view along section A-A of shown in FIG. 7.
Figure 9:
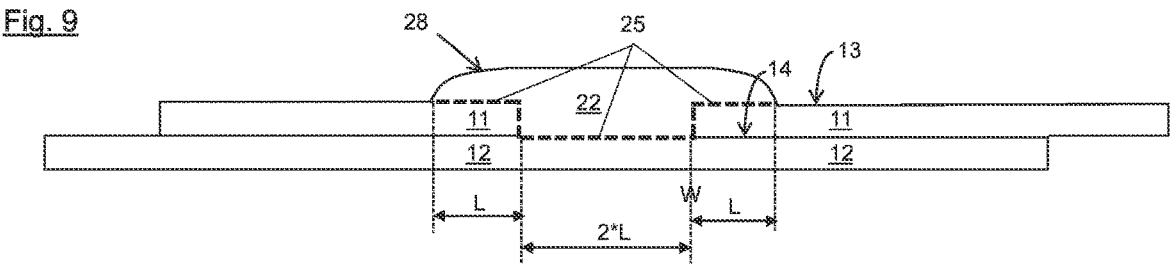
FIG. 9 depicts a schematic view sectional view along section B-B of shown in FIG. 7.

FIG. 8 shows scaled section A-A as indicated in FIG. 7, while FIG. 9 shows scaled section B-B as indicated in FIG. 7. The injected hot thermoplastic material 22 forms within portions of upper surfaces 13 and 14 of first and second parts 11, 12 a contact area 25. That contact area 25 shown as a dashed line melts during the injection of the hot melted thermoplastic material 22, and thus connects both thermoplastic composite parts 11, 12. In addition, the injected hot thermoplastic material 22 mutually with the thermoplastic materials of the parts 11, 12 in that contact area. After cooling down and solidification of the thermoplastic materials both parts 11, 12 are welded to each other The width W of contact area 25 formed at the upper surface 14 of second part 12 is twice the width of the contact area 25 formed in upper surface 13 of first part 11 on both sides of orifice 17 filled and covered by thermoplastic material 22.

The same applies for the length L of contact area 25 formed at the upper surface 14 of second part 12. It is twice the length L of contact area 25 formed in upper surface 13 of part 11 on both sides of orifice 17 in its longitudinal extension.

Referring now to FIGS. 10 through 12, where another preferred example of the welding process according to the disclosure herein is shown, the welding method applied to weld parts with multiple welding points will be described.

As shown in FIG. 10, the first composite part 11 made from thermoplastic material is configured as an L-shape profile forming a stringer. The second composite part 12 made from thermoplastic material is configured as a relatively thin panel forming a skin element which shall be joined to the profile element 11 by injection welding as described above.

A portion 26 of profile element 11 is provided with a plurality of orifices 17 forming multiple injection spots 24. Profile element 11 is positioned on the upper side 14 of skin element 12. Both composite parts 11, 12 are positioned in a way that portion 26 is contacting an area of the skin element 12. Regarding further details, reference is made to the above description.

FIG. 11 shows the injection of melted thermoplastic material 22 through the plurality of orifices 17, whereby the melted material 22 contacts the upper side 14 of the skin element 12 within the areas of orifices 17, and it also contacts the inner walls of orifices 17 provided in portion 26 of profile element 11. Further, the heated and melted thermoplastic material 22 also contacts the upper side 13 of portion 26 in areas where the melted material 22 extends over the edges of orifices 17.

In this embodiment, a plurality of injection devices 23 and clamping tools 21 are connected to each other, thus forming an injection assembly 27. By injection assembly 27, the melted thermoplastic material 22 is injected locally and simultaneously into the plurality of orifices 17.

For further details of the injection welding process, reference is made to FIGS. 1 to 9 and the above description related thereto.

As can be seen from FIG. 12, the multiple injection spots 24 are filled with injected and solidified thermoplastic material 22 and thus permanently join both parts 11, 12.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 11 first part/profile element
12 second part/skin element
13, 14 top side/upper side of first and second part
15, 16 bottom side/underside of first and second part
17 orifice/opening
18, 19 portions of first/second part
21 clamping tool
22 thermoplastic material
23 injection device
24 injection spot
25 contact area
26 portion of profile element
27 injection assembly
28 clasp or plug
30 arrangement

The invention claimed is:

1. A method of permanently joining first and second composite parts of an aircraft together, the method comprising:
   providing:
      first composite part that is a skin element of the aircraft and is made from and comprises a thermoplastic material:
      a second composite part that is a profile element of the aircraft and is made from and comprises the thermoplastic material;
      wherein an orifice is in at least one of the first composite part and
   the second composite part;
   positioning both of the first and second composite parts such that a portion of whichever of the first and second composite parts comprises the orifice is adjacent to a portion of the other of the first and second composite parts;
   injecting a melted thermoplastic material through the orifice to contact the first composite part and the second composite part in a contact area, whereby to melt together surfaces of the first composite part and the second composite part in the contact area; and
   solidifying the melted thermoplastic material in the orifice and in the contact area to permanently join the first composite part to the second composite part.

2. The method according to claim 1, wherein a portion of the contact area is formed at an inner wall of the orifice within the first composite part and at a bottom of the orifice formed by the surface of the second composite part in an area of the orifice.

3. The method according to claim 1, wherein a portion of the contact area protrudes over a portion of the first composite part on its side opposite the second composite part.

4. The method according to claim 3, wherein the portion of the contact area protruding over the first composite part on each side of the orifice has at least half of a width of the contact area at a bottom of the orifice.

5. The method according to claim 1, wherein the orifice is an elongated hole.

6. The method according to claim 1, wherein the first and the second composite part are clamped together after positioning both parts.

7. The method according to claim 1, wherein the melted thermoplastic material is simultaneously injected in a plurality of orifices that are in at least one of the first and second composite parts to permanently join the first and second composite parts.

* * * * *